US008553366B1

(12) United States Patent
Hanke (10) Patent No.: US 8,553,366 B1
(45) Date of Patent: Oct. 8, 2013

(54) DISK DRIVE WITH ACTUATOR PIVOT BEARING HAVING A SURFACE COATING INHIBITING LUBRICANT MIGRATION

(71) Applicant: Western Digital Technologies, Inc., Irvine, CA (US)

(72) Inventor: Frederick J. Hanke, Newark, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/708,793

(22) Filed: Dec. 7, 2012

(51) Int. Cl.
*G11B 17/02* (2006.01)

(52) U.S. Cl.
USPC ............................................................ 360/264.2

(58) Field of Classification Search
USPC .................. 360/264.2, 264, 266, 265.7, 265, 360/360/265.2, 265.1, 265.9, 245, 245.9, 360/264.4, 264.3
See application file for complete search history.

(56) References Cited

U.S. PATENT DOCUMENTS

| | | | |
|---|---|---|---|
| 6,084,753 A * | 7/2000 | Gillis et al. | 360/128 |
| 6,280,094 B1 | 8/2001 | Gilliland et al. | |
| 6,354,743 B2 | 3/2002 | Muraki et al. | |
| 6,754,024 B2 | 6/2004 | Suk et al. | |
| 6,762,909 B2 * | 7/2004 | Albrecht et al. | 360/99.21 |
| 6,961,214 B2 * | 11/2005 | Ameen et al. | 360/99.08 |
| 7,160,622 B2 | 1/2007 | Okamiya et al. | |
| 2002/0158529 A1 | 10/2002 | Liu et al. | |
| 2004/0021980 A1 * | 2/2004 | Albrecht et al. | 360/97.02 |
| 2004/0120072 A1 * | 6/2004 | Ameen et al. | 360/99.08 |
| 2010/0058573 A1 | 3/2010 | Sanjay et al. | |

* cited by examiner

*Primary Examiner* — Allen T Cao

(57) ABSTRACT

An actuator pivot bearing is disposed at least partially within a bore in the body of a disk drive head actuator. The actuator pivot bearing includes a lubricant wetting a first surface, and a coating on a second surface. The coating has a surface energy such that the lubricant does not wet the second surface.

21 Claims, 7 Drawing Sheets

DISK DRIVE WITH ACTUATOR PIVOT BEARING HAVING A SURFACE COATING INHIBITING LUBRICANT MIGRATION

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element), and an inductive write structure comprising a flat coil deposited by photolithography, and a yoke structure having pole tips that face a disk media. The HGA typically also includes a suspension assembly that includes a mounting plate, a load beam, and a laminated flexure to carry the electrical signals to and from the read head. The read head is typically bonded to a tongue feature of the laminated flexure.

The HGA, in turn, is a sub-component of a head stack assembly (HSA) that typically includes a plurality of HGAs, a head actuator, and a flex cable. The mounting plate of each suspension assembly is attached to an arm of the head actuator (e.g. by swaging), and each of the laminated flexures includes a flexure tail that is electrically connected to the HSA's flex cable (e.g. by solder reflow bonding or ultrasonic bonding). The angular position of the HSA, and therefore the position of the read heads relative to data tracks on the disks, is actively controlled by the head actuator which is typically driven by a voice coil motor (VCM). Specifically, electrical current passed through a coil of the VCM applies a torque to the head actuator, so that the read head can seek and follow desired data tracks on the spinning disk.

The head actuator of the HSA is pivotally attached to a base of the disk drive, for example by an actuator pivot bearing cartridge that allows the HSA to pivot. The relative position of other disk drive components limits such pivoting to a limited angular range. The actuator pivot bearing cartridge typically includes a lubricant such as grease. However, small amounts of the lubricant may undesirably migrate from the actuator pivot bearing cartridge to other locations within the disk drive, such as the head or disk. Such lubricant migration can thereby contaminate other disk drive components (e.g. the head or disk), reducing the reliability and/or lifetime of the disk drive and threating the data stored within. Hence, there is a need in the art for a disk drive actuator pivot bearing that can reduce the migration of an internal lubricant.

DETAILED DESCRIPTION OF EXEMPLARY EMBODIMENTS

Figure 1:
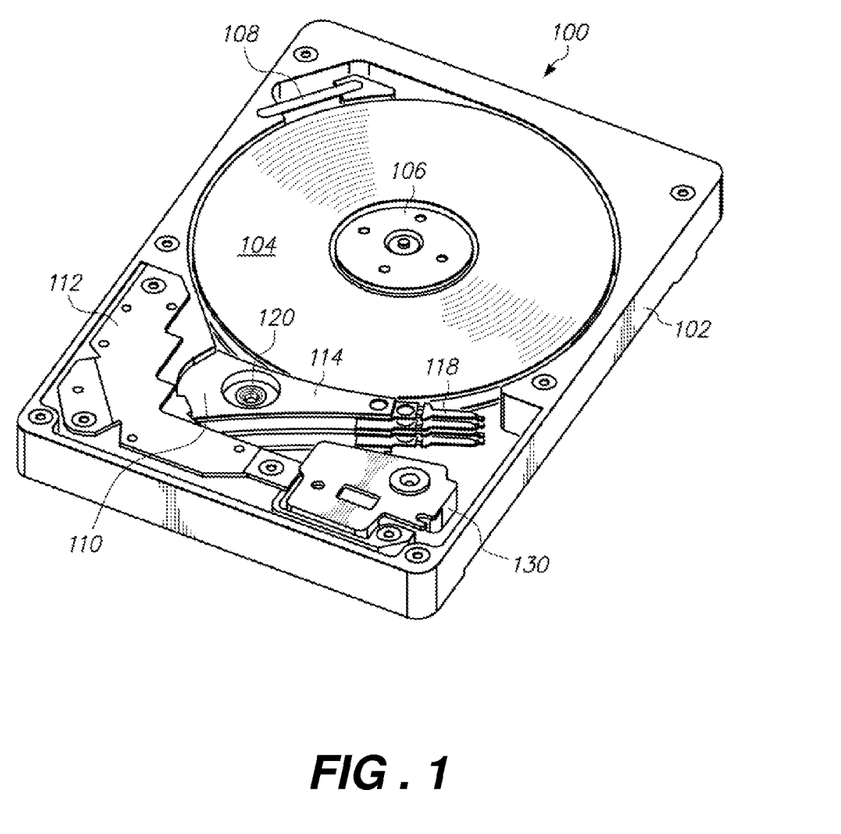
FIG. 1 is top perspective view of a disk drive capable of including an embodiment of the present invention, with the disk drive cover removed to enable viewing of internal components.

FIG. 1 is top perspective view of a disk drive 100 capable of including an embodiment of the present invention, with the disk drive cover removed to enable viewing of certain internal disk drive components. The disk drive 100 includes a disk drive base 102. The disk drive 100 further includes a spindle 106, rotably mounted on the disk drive base 102, for rotating at least one disk 104 that is mounted on the spindle 106. In certain embodiments, disk drive 100 may have only a single disk 104, or alternatively, two or more disks. The rotation of the disk(s) 104 establishes air flow through an optional recirculation filter 108. The disk drive 100 may optionally also include an adsorbant filter 130 for helping to remove contaminants from the internal atmosphere within the disk drive, if and after such contaminants have entered the internal atmosphere within the disk drive.

In the embodiment of FIG. 1, the disk drive 100 further includes a head actuator 110 that is pivotably mounted on disk drive base 102 by an actuator pivot bearing 120. The head actuator 110 includes a plurality of actuator arms (e.g. actuator arm 114), each supporting a head gimbal assembly (e.g. HGA 118). For example, the HGA 118 may be attached to a distal end of the actuator arm 114 by the well-known conventional attachment process known as swaging. Preferably the disk drive 100 will include one HGA 118 per disk surface, but depopulated disk drives are also contemplated in which fewer HGAs are used. In FIG. 1, the HGAs 118 is shown demerged from the disk 104, so that the disks do not obscure the HGAs from view. In such position, the HGAs would be supported by a conventional head loading ramp (not shown in FIG. 1 so that the view of the HGAs will not be obstructed).

The distal end of the HGA 118 includes a conventional read head (too small to be seen in the view of FIG. 1) for reading and writing data from and to a magnetic disk (e.g. disk 104). The read head may optionally include a ceramic slider substrate and a read/write transducer that may be an inductive magnetic write transducer merged with a magneto-resistive read transducer (e.g. a tunneling magneto-resistive read transducer). Note: Any head that includes a read transducer is referred to as a "read head" herein, even if the head also includes other structures for performing other functions (e.g. writer, microactuator, heater, lapping guide, etc). Note also that in certain optical disk drives, it is possible for a read head to include an objective lens rather than a read transducer.

Also in the embodiment of FIG. 1, a magnet 112 may provide a magnetic field for a voice coil motor to pivot the head actuator 110 about the actuator pivot bearing 120 through a limited angular range, so that the read head of HGA 118 may be desirably positioned relative to one or more tracks of information on the disk 104.

Figure 2:
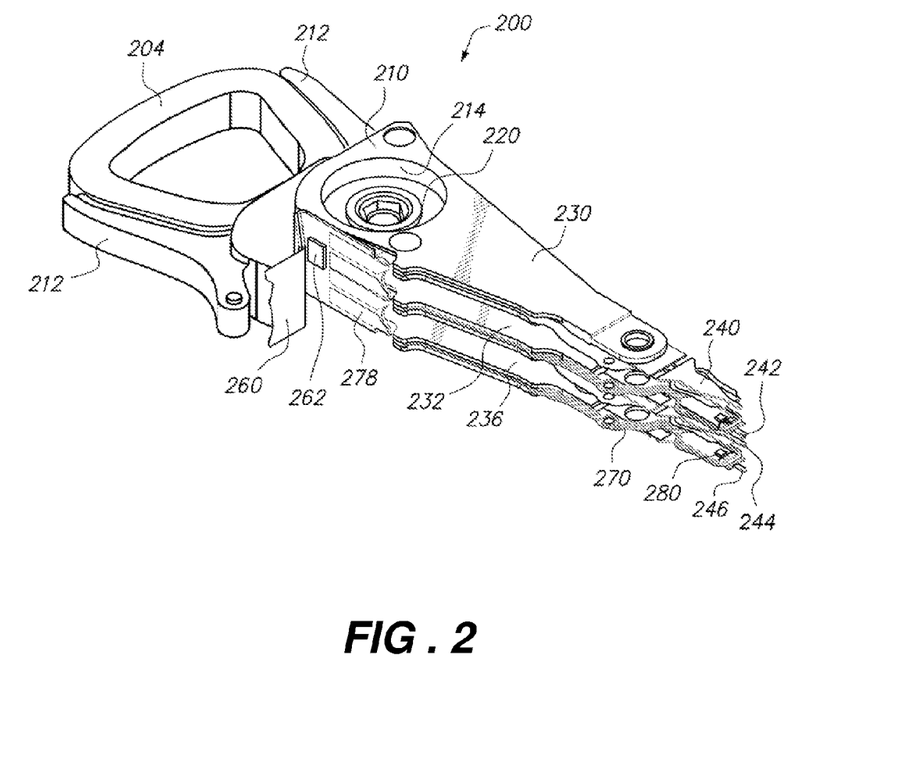
FIG. 2 is a top perspective view of a head actuator assembly capable of including an embodiment of the present invention.

FIG. 2 is a top perspective view of a head actuator 200 capable of including an embodiment of the present invention. The head actuator 200 includes an actuator body 210. In the embodiment of FIG. 2, actuator arms 230, 232, 236 extend from the actuator body 210 in a first direction, while a voice coil support 212 and a voice coil 204 extend from the actuator body 210 in a second direction that is approximately opposite the first direction. An electrical current driven through the voice coil 204 may interact with a magnetic field from a permanent magnet within the disk drive (e.g. magnet 112 of FIG. 1), to create a torque to pivot and control the angular position of the head actuator 200.

In the embodiment of FIG. 2, the actuator arms 230, 232, 236 support head gimbal assemblies (HGAs) 240, 242, 244, 246. Specifically, the actuator arm 230 supports the HGA 240, the actuator arm 232 supports the HGAs 242 and 244, and the actuator arm 236 supports the HGA 246. In the embodiment of FIG. 2, each of the HGAs 240, 242, 244, and 246, in turn, supports a read head. For example, the HGA 246 includes a flexure 270 that supports a read head 280 and that includes conductive traces to facilitate electrical connection to the read head 280. A terminal region 278 of the flexure 270 may be electrically connected to a flex cable 260, which runs to an external connector, and upon which a pre-amplifier chip 262 may optionally be mounted.

In the embodiment of FIG. 2, the actuator body 210 includes a bore 214 therein, and an actuator pivot bearing 220 disposed at least partially within the bore 214. As will be described in more detail later in this specification, the actuator pivot bearing 220 may include an inner shaft that is fixed to the disk drive base (e.g. disk drive base 102 of FIG. 1), and a rotatable outer portion that may be attached to the actuator body 210. For example, in certain embodiments, the actuator pivot bearing 220 may include a rotatable outer sleeve that is press-fit into the bore 214 of the actuator body 210, and/or held in place within the bore 214 of the actuator body 210 by a conventional tolerance ring. Alternatively, the actuator pivot bearing 220 may be held within the bore 214 of the actuator body 210 by a conventional C-clip. Alternatively, the actuator pivot bearing 220 may instead have rotatable outer bearing races that are directly bonded to an inner surface of the bore 214 in the actuator body 210, for example, by a conventional adhesive.

Figure 3A:
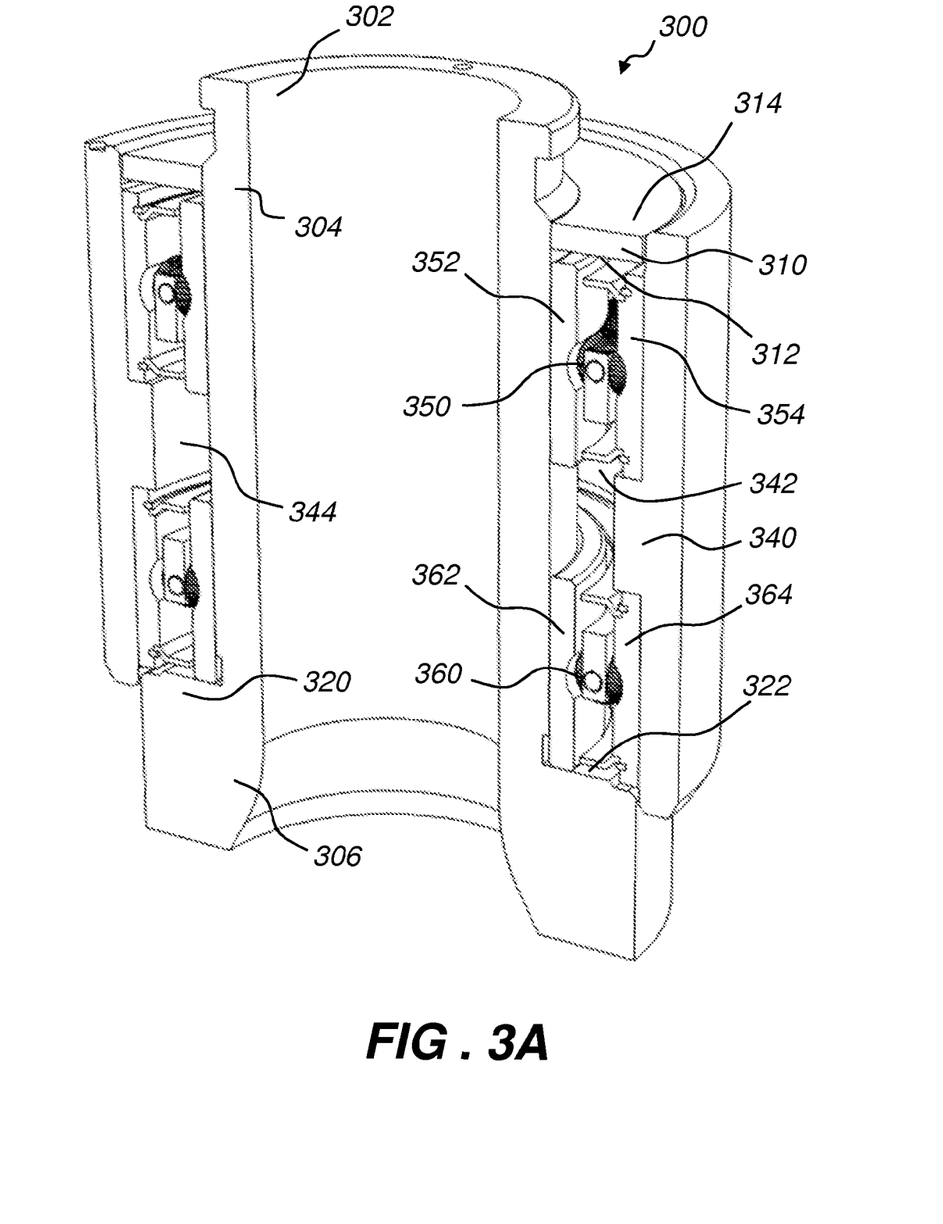
FIG. 3A is a cut-away perspective view of an actuator pivot bearing according to an embodiment of the present invention.
Figure 3B:
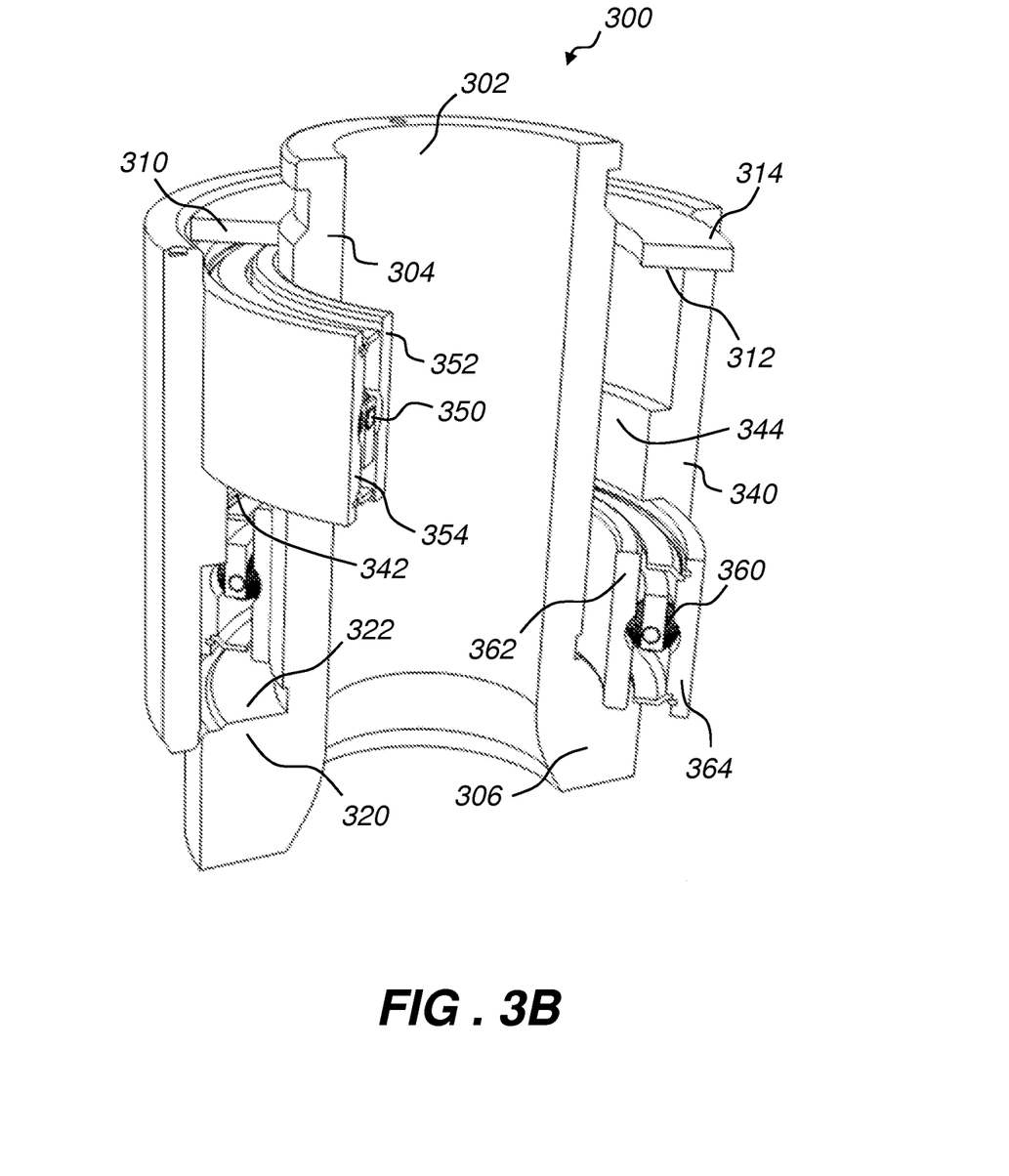
FIG. 3B depicts the actuator pivot bearing of FIG. 3A, except with certain sub-components partially rotated (after the cut-away) for better visibility.

FIG. 3A is a cut-away perspective view of an actuator pivot bearing 300 according to an embodiment of the present invention. FIG. 3B also depicts the actuator pivot bearing 300, except with certain sub-components partially rotated (after the cut-away) for better visibility. Now referring to FIGS. 3A and 3B, the actuator pivot bearing 300 preferably includes a fixed inner bearing shaft 302, and a bearing cap 310 attached to an upper portion 304 of the fixed inner bearing shaft 302. A lower portion 306 of the fixed inner bearing shaft 302 has a bottom flange 320. In this context and as shown in FIGS. 3A and 3B, a "flange" is a location of substantially increased diameter along the fixed inner bearing shaft 302.

In the embodiment of FIGS. 3A and 3B, the actuator pivot bearing 300 also includes an upper ball bearing 350, which includes an upper bearing inner race 352 and an upper bearing outer race 354. Also in the embodiment of FIGS. 3A and 3B, the actuator pivot bearing 300 includes a lower ball bearing 360, which has a lower bearing inner race 362 and a lower bearing outer race 364. In the embodiment of FIGS. 3A and 3B, a lubricant wets at least one surface of the upper ball bearing 350 and/or the lower ball bearing 360. For example, oil and/or grease may wet the surface of the upper bearing inner race 352, the upper bearing outer race 354, the lower bearing inner race 362, and/or the lower bearing outer race 364.

Figure 4:
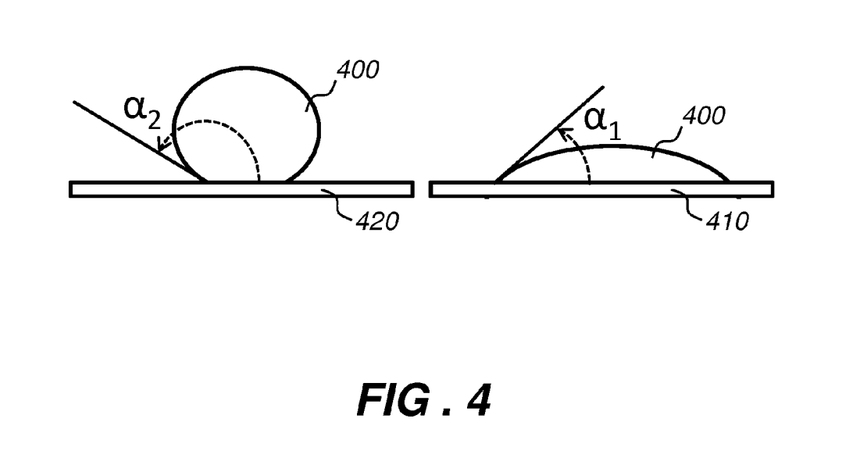
FIG. 4 depicts a lubricant that wets a first surface but that does not wet a second surface.

In the present context, a lubricant is said to "wet" a surface if adhesive forces between the lubricant and the surface (which encourage the lubricant to spread across the surface) exceed cohesive forces within the lubricant (which encourage the lubricant to ball up and therefore avoid increased contact with the surface at the lubricant's edges). However, if the cohesive forces are stronger than the adhesive forces, then the lubricant is said to not wet the surface. For example, FIG. 4 depicts a lubricant 400 that wets a first surface 410, but that does not wet a second surface 420. Referring to FIG. 4, if the droplet edge contact angle $\alpha_1$ is less than 90°, then the lubricant 400 is said (in the context of certain embodiments) to wet the first surface 410, and the lubricant 400 would be more likely to spread over a larger area of the first surface 410. If the droplet edge contact angle $\alpha_2$ is greater than 90°, then the lubricant 400 is said (in the context of certain embodiments) to not wet the second surface 420, so that the lubricant 400 would be less likely to spread over a larger area of the second surface 420. Rather, in the non-wetting case, the lubricant 400 would be more likely to form a compact truncated spheroidal droplet on the second surface 420.

Now referring again to FIGS. 3A and 3B, an upper surface 322 of the bottom flange 320 of the lower portion 306 of the fixed inner bearing shaft 302 is shown to face the upper ball bearing 350 and/or the lower ball bearing 360 and therefore faces the lubricant that wets one or more surfaces of the upper ball bearing 350 and/or the lower ball bearing 360. Also in the embodiment of FIGS. 3A and 3B, the bearing cap 310 has an underside 312 and an outer surface 314. The underside 312 of the bearing cap 310 is shown in FIGS. 3A and 3B to face the upper ball bearing 350 and/or the lower ball bearing 360 and therefore faces the lubricant that wets one or more surfaces of the upper ball bearing 350 and/or the lower ball bearing 360.

In the embodiment of FIGS. 3A and 3B, the actuator pivot bearing 300 optionally includes a rotatable outer bearing sleeve 340 fixed to the actuator body (e.g. actuator body 210 of FIG. 2) so that the actuator pivot bearing 300 may be considered as an actuator pivot bearing "cartridge." In the embodiment of FIGS. 3A and 3B, the actuator pivot bearing cartridge 300 has an internal cartridge space 342 that is bounded by an inner surface 344 of the rotatable outer bearing sleeve 340, the underside 312 of the bearing cap 310, and the upper surface 322 of the bottom flange 320. Note that the inner surface 344 of the rotatable outer bearing sleeve 340 is shown in FIGS. 3A and 3B to face the internal cartridge space 342. The upper ball bearing 350 and the lower ball bearing 360 are disposed within the internal cartridge space 342, and hence the lubricant is also disposed within the internal cartridge space 342.

In certain embodiments, control of lubricant migration may be enhanced by coating the underside 312 of the bearing cap 310 with a coating material that has a surface energy such that the lubricant does not wet the surface of the underside 312 of the bearing cap 310. In certain embodiments, the coating material may be a fluorinated acrylate, a methacrylate, a vinyl ether, or an itaconate. In certain other embodiments, the coating material may be a copolymer of fluorinated acrylates, methacrylates, vinyl ethers, and itaconates with non-fluorinated acrylates, methacrylates and vinyl ethers.

For example the coating may include a coating material in the family of perfluorinated and partially perfluorinated acrylates, including compounds such as 1,1,1,3,3,3-hexafluoroisopropyl acrylate, 1H,1H,2H,2H-heptadecafluorodecyl acrylate, 1H,1H,5H-octafluoropentyl acrylate, 1H,1H-heptafluorobutyl acrylate, 2,2,2-trifluoroethyl acrylate and 1H,1H,3H-hexafluorobutyl acrylate, and pentafluorophenyl acrylate.

Alternatively or in addition, the coating may include a coating material in the family of perfluorinated and partially perfluorinated methacylates, including compounds such as 1H,1H,5H-octafluoropentyl methacrylate, 1H,1H,3H-hexafluorobutyl methacrylate, 1H,1H,2H,2H-heptadecafluorodecyl methacrylate, 1H,1H,3H-tetrafluoropropyl methacrylate, pentafluorophenyl methacrylate, hexafluoro-isopropyl methacrylate, 2,2,2-trifluoroethyl methacrylate, and 1H,1H,7H-dodecafluoroheptyl methacrylate.

Alternatively or in addition, the coating may include a coating material in the family of perfluorinated and partially perfluorinated itaconates, including compounds such as bis-(1,1,1,3,3,3-hexafluoroisopropyl)itaconate, and bis-(2,2,2-trifluoroethyl)itaconate.

Such a coating may optionally be fabricated by diluting the coating material in a solvent to achieve a concentration of 0.1% to 2.0%. The dilute material is then dispensed upon the desired surface (e.g. by dipping, spraying, etc) to produce a film. After approximately 5-30 seconds of evaporation time, and with or without additional cure time of 15-60 minutes at 70-150° C., a final coating thickness between 0.1 μm to 1 μm may be achieved.

Referring again to FIGS. 3A and 3B, control of lubricant migration may be enhanced in certain embodiments, alternatively or in addition, by coating the inner surface 344 of the rotatable outer bearing sleeve 340 and/or the upper surface 322 of the bottom flange 320 with the aforedescribed coating material. In certain embodiments, the outer surface 314 of the bearing cap 310 may also be coated with the aforedescribed coating material, also to enhance the control of lubricant migration. In certain embodiments, the enhancement of the control of lubricant migration that is described herein may advantageously relax the requirement for as tight a clearance between the bearing cap 310 (and/or the bottom flange 320) and the rotatable outer bearing sleeve 340, thereby improving the manufacturability and reducing the cost of the pivot bearing 300.

Figure 5:
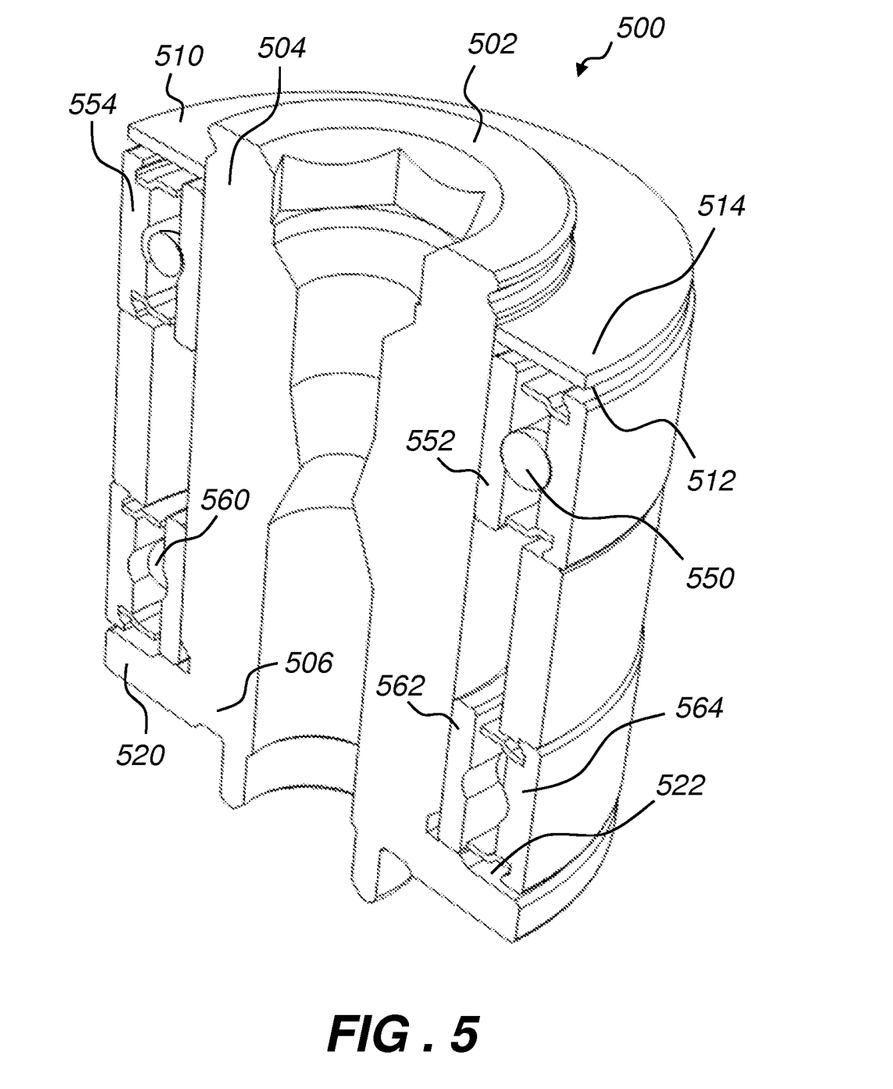
FIG. 5 is a cut-away perspective view of an actuator pivot bearing according to another embodiment of the present invention.

FIG. 5 is a cut-away perspective view of an actuator pivot bearing 500 according to another embodiment of the present invention. The actuator pivot bearing 500 preferably includes a fixed inner bearing shaft 502, and a bearing cap 510 attached to an upper portion 504 of the fixed inner bearing shaft 502. A lower portion 506 of the fixed inner bearing shaft 502 has a bottom flange 520. In this context and as shown in FIG. 5, a "flange" is a location of substantially increased diameter along the fixed inner bearing shaft 502.

In the embodiment of FIG. 5, the actuator pivot bearing 500 also includes an upper ball bearing 550, which includes an upper bearing inner race 552 and an upper bearing outer race 554. Also in the embodiment of FIG. 5, the actuator pivot bearing 500 includes a lower ball bearing 560, which has a lower bearing inner race 562 and a lower bearing outer race 564. In the embodiment of FIG. 5, a lubricant wets at least one surface of the upper ball bearing 550 and/or the lower ball bearing 560. For example, oil and/or grease may wet the surface of the upper bearing inner race 552, the upper bearing outer race 554, the lower bearing inner race 562, and/or the lower bearing outer race 564.

In the embodiment of FIG. 5, an upper surface 522 of the bottom flange 520 of the lower portion 506 of the fixed inner bearing shaft 502 is shown to face the upper ball bearing 550 and/or the lower ball bearing 560 and therefore faces the lubricant that wets one or more surfaces of the upper ball bearing 550 and/or the lower ball bearing 560. Also in the embodiment of FIG. 5, the bearing cap 510 has an underside 512 and an outer surface 514. The underside 512 of the bearing cap 510 is shown in FIG. 5 to face the upper ball bearing 550 and/or the lower ball bearing 560 and therefore faces the lubricant that wets one or more surfaces of the upper ball bearing 550 and/or the lower ball bearing 560.

In the embodiment of FIG. 5, the actuator pivot bearing 500 lacks a rotatable outer bearing sleeve, so that the outer races 554, 564 are intended to be directly bonded or otherwise attached to an inner surface of the bore in the actuator body (e.g. the bore 214 in the actuator body 210 of FIG. 2). Hence in the embodiment of FIG. 5, the actuator pivot bearing 500 may not be considered as an actuator pivot bearing "cartridge."

In certain embodiments, control of lubricant migration may be enhanced by coating the underside 512 of the bearing cap 510 with a coating material that has a surface energy such that the lubricant does not wet the surface of the underside 512 of the bearing cap 510. In certain embodiments, the coating material may be a fluorinated acrylate, a methacrylate, a vinyl ether, or an itaconate. In certain other embodiments, the coating material may be a copolymer of fluorinated acrylates, methacrylates, vinyl ethers, and itaconates with non-fluorinated acrylates, methacrylates and vinyl ethers.

Alternatively or in addition, control of lubricant migration may be enhanced in certain embodiments by coating the upper surface 522 of the bottom flange 520, and/or the outer surface 514 of the bearing cap 510, with the aforedescribed coating material. In certain embodiments, the enhancement of the control of lubricant migration that is described herein may advantageously relax the requirement for as tight a clearance between the bearing cap 510 (and/or the bottom flange 520) and the inner surface of the bore in the actuator body (e.g. the bore 214 in the actuator body 210 of FIG. 2), thereby improving the manufacturability and reducing the cost of the pivot bearing 500.

Figure 6:
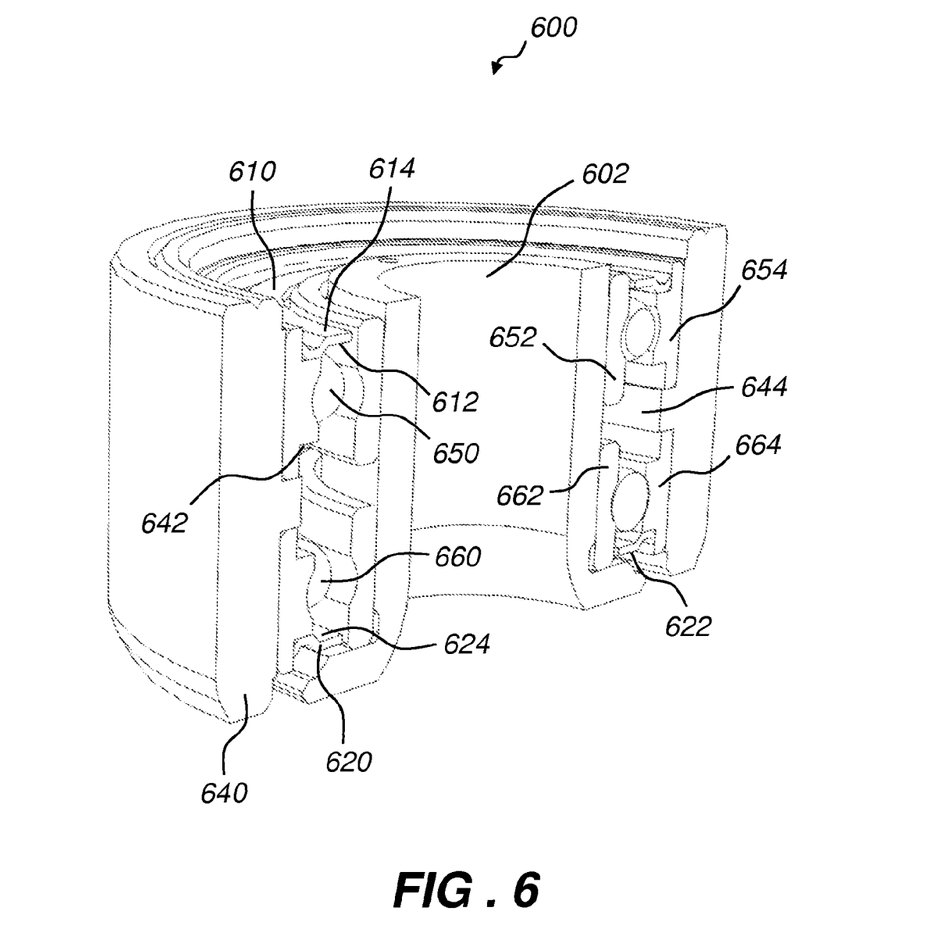
FIG. 6 is a cut-away perspective view of an actuator pivot bearing according to another embodiment of the present invention.

FIG. 6 is a cut-away perspective view of an actuator pivot bearing 600 according to another embodiment of the present invention. The actuator pivot bearing 600 preferably includes a fixed inner bearing shaft 602 and an upper ball bearing 650, which includes an upper bearing inner race 652 and an upper bearing outer race 654. Also in the embodiment of FIG. 6, the actuator pivot bearing 600 includes a lower ball bearing 660, which has a lower bearing inner race 662 and a lower outer race 664. In the embodiment of FIG. 6, a lubricant wets at least one surface of the upper ball bearing 650 and/or the lower ball bearing 660. For example, oil and/or grease may wet the surface of the upper bearing inner race 652, the upper bearing outer race 654, the lower bearing inner race 662, and/or the lower bearing outer race 664.

In the embodiment of FIG. 6, the actuator pivot bearing 600 includes a top bearing cap 610 and a bottom bearing cap 620 that are not attached to the fixed inner bearing shaft 602, but rather rotate with the outer races 654, 664 (e.g. are directly or indirectly fixed to the outer races 654, 664). An underside 612 of the top bearing cap 610, and an upper surface 624 of the bottom bearing cap 620, are shown to face the upper ball bearing 650 and the lower ball bearing 660, and therefore face the lubricant that wets one or more surfaces of the upper ball bearing 650 and/or the lower ball bearing 660. By contrast, an upper surface 614 of the top bearing cap 610, and an underside 622 of the bottom bearing cap 620, face away from the upper ball bearing 650 and the lower ball bearing 660.

In the embodiment of FIG. 6, the actuator pivot bearing 600 optionally includes a rotatable outer bearing sleeve 640 fixed to the actuator body (e.g. actuator body 210 of FIG. 2), so the actuator pivot bearing 600 may be considered as an actuator pivot bearing "cartridge." In the embodiment of FIG. 6, the actuator pivot bearing cartridge 600 has an internal cartridge space 642 that is bounded by an inner surface 644 of the rotatable outer bearing sleeve 640, the underside 612 of the top bearing cap 610, and the upper surface 624 of the bottom bearing cap 620. Note that the inner surface 644 of the rotatable outer bearing sleeve 640 is shown in FIG. 6 to face the internal cartridge space 642. The upper ball bearing 650 and the lower ball bearing 660 are disposed within the internal cartridge space 642, and hence the lubricant is also disposed within the internal cartridge space 642.

In certain embodiments, control of lubricant migration may be enhanced by coating the underside 612 of the top bearing cap 610, and/or the upper surface 624 of the bottom bearing cap 620 with a coating material that has a surface energy such that the lubricant does not wet that surface. In certain embodiments, the coating material may be a fluorinated acrylate, a methacrylate, a vinyl ether, or an itaconate. In certain other embodiments, the coating material may be a copolymer of fluorinated acrylates, methacrylates, vinyl ethers, and itaconates with non-fluorinated acrylates, methacrylates and vinyl ethers.

Alternatively or in addition, control of lubricant migration may be enhanced by coating the inner surface 644 of the rotatable outer bearing sleeve 640 with the aforedescribed coating material. In certain embodiments, the upper surface 614 of the top bearing cap 610, and/or the underside 622 of the bottom bearing cap 620 may also be coated with the aforedescribed coating material, also to enhance the control of lubricant migration. In certain embodiments, the enhancement of the control of lubricant migration that is described herein may, in turn, advantageously relax the requirement for as tight a clearance between the top bearing cap 610 and the upper bearing inner race 652, and/or between the bottom bearing cap 620 and the lower bearing inner race 662, thereby improving the manufacturability and reducing the cost of the pivot bearing 600.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
   a disk drive base;
   a rotatable spindle attached to the disk drive base;
   a disk mounted on the rotatable spindle; and
   a head actuator pivotally attached to the disk drive base, the head actuator including
      an actuator body including a bore therein,
      an actuator arm extending from the actuator body and supporting a read head; and
      an actuator pivot bearing disposed at least partially within the bore, the actuator pivot bearing including
         a first surface,
         a lubricant wetting the first surface,
         a second surface, and
         a coating on the second surface, the coating having a surface energy such that the lubricant does not wet the second surface.

2. The disk drive of claim 1 wherein the coating comprises a coating material selected from the group consisting of fluorinated acrylates, methacrylates, vinyl ethers, and itaconates.

3. The disk drive of claim 2 wherein the coating has a thickness in the range 0.1 µm to 1 µm.

4. The disk drive of claim 1 wherein the actuator pivot bearing comprises a fixed inner bearing shaft and a bearing cap attached to an upper portion of the fixed inner bearing shaft, and wherein the second surface is an underside of the bearing cap that faces the lubricant.

5. The disk drive of claim 4 wherein the coating is disposed on both the second surface, and on an outer surface of the bearing cap that faces away from the lubricant.

6. The disk drive of claim 1 wherein the actuator pivot bearing comprises a fixed inner bearing shaft having a bottom flange, and wherein the second surface is an upper surface of the bottom flange that faces the lubricant.

7. The disk drive of claim 1 wherein the actuator pivot bearing comprises a fixed inner bearing shaft and a bearing cap attached to an upper portion of the fixed inner bearing shaft, and wherein the actuator pivot bearing is an actuator pivot bearing cartridge that comprises a rotatable outer bearing sleeve fixed to the actuator body, the actuator pivot bearing cartridge having an internal cartridge space that is bounded by the rotatable outer bearing sleeve and the bearing cap, the first surface and the lubricant being disposed within the internal cartridge space.

8. The disk drive of claim 7 wherein the second surface is a surface of the rotatable outer bearing sleeve that faces the internal cartridge space.

9. The disk drive of claim 1 wherein the lubricant comprises oil or grease.

10. The disk drive of claim 1 wherein the actuator pivot bearing comprises a rotatable outer bearing race, and a bearing cap attached to the rotatable outer bearing race, and wherein the second surface is an underside of the bearing cap that faces the lubricant.

11. An actuator pivot bearing configured to be disposed at least partially within a bore of an actuator body, the actuator pivot bearing including
   a first surface,
   a lubricant wetting the first surface,
   a second surface, and
   a coating on the second surface, the coating having a surface energy such that the lubricant does not wet the second surface.

12. The actuator pivot bearing of claim 11 wherein the coating comprises a coating material selected from the group consisting of fluorinated acrylates, methacrylates, vinyl ethers, and itaconates.

13. The actuator pivot bearing of claim 12 wherein the coating has a thickness in the range 0.1 µm to 1 µm.

14. The actuator pivot bearing of claim 11 wherein the actuator pivot bearing comprises a fixed inner bearing shaft and a bearing cap attached to an upper portion of the fixed inner bearing shaft, and wherein the second surface is an underside of the bearing cap that faces the lubricant.

15. The actuator pivot bearing of claim 14 wherein the coating is disposed on both the second surface, and on an outer surface of the bearing cap that faces away from the lubricant.

16. The actuator pivot bearing of claim 11 wherein the actuator pivot bearing comprises a fixed inner bearing shaft having a bottom flange, and wherein the second surface is an upper surface of the bottom flange that faces the lubricant.

17. The actuator pivot bearing of claim 11 wherein the actuator pivot bearing comprises a fixed inner bearing shaft and a bearing cap attached to an upper portion of the fixed inner bearing shaft, and wherein the actuator pivot bearing is an actuator pivot bearing cartridge that comprises a rotatable outer bearing sleeve fixed to the actuator body, the actuator pivot bearing cartridge having an internal cartridge space that is bounded by the rotatable outer bearing sleeve and the bearing cap, the first surface and the lubricant being disposed within the internal cartridge space.

18. The actuator pivot bearing of claim 17 wherein the second surface is a surface of the rotatable outer bearing sleeve that faces the internal cartridge space.

19. The actuator pivot bearing of claim 11 wherein the lubricant comprises oil or grease.

20. The actuator pivot bearing of claim 11 wherein the actuator pivot bearing comprises a rotatable outer bearing race, and a bearing cap attached to the rotatable outer bearing race, and wherein the second surface is an underside of the bearing cap that faces the lubricant.

21. A head actuator comprising:
   an actuator body including a bore therein,
   an actuator arm extending from the actuator body and adapted to support a read head; and
   the actuator pivot bearing of claim 11.

\* \* \* \* \*